(12) United States Patent
Kadotani et al.

(10) Patent No.: US 9,618,755 B2
(45) Date of Patent: Apr. 11, 2017

(54) PROJECTOR HAVING HOLDING UNIT FOR LIGHT MODULATING DEVICE AND SUPPORTING MEMBER FOR THE HOLDING UNIT

(75) Inventors: Masato Kadotani, Matsumoto (JP); Takanori Fukuyama, Matsumoto (JP); Kosuke Yoshinaga, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 297 days.

(21) Appl. No.: 13/533,350

(22) Filed: Jun. 26, 2012

(65) Prior Publication Data
US 2013/0002971 A1 Jan. 3, 2013

(30) Foreign Application Priority Data

Jun. 30, 2011 (JP) ................................. 2011-145376

(51) Int. Cl.
| | | |
|---|---|---|
| G02B 27/14 | (2006.01) | |
| G02B 27/10 | (2006.01) | |
| H04N 9/31 | (2006.01) | |
| G03B 21/00 | (2006.01) | |
| G03B 21/14 | (2006.01) | |

(52) U.S. Cl.
CPC ......... G02B 27/141 (2013.01); G02B 27/102 (2013.01); G03B 21/006 (2013.01); G03B 21/145 (2013.01); H04N 9/3141 (2013.01)

(58) Field of Classification Search
CPC ........ G03B 21/14; H04N 9/31; H04N 9/3141; H04N 9/315
USPC .................................................. 353/119, 122
See application file for complete search history.

(56) References Cited

U.S. PATENT DOCUMENTS

2007/0121079 A1* 5/2007 Kitabayashi ......... G03B 21/006
353/31

FOREIGN PATENT DOCUMENTS

| JP | 2008225168 A | * | 9/2008 |
| JP | 2009-210779 A | | 9/2009 |

* cited by examiner

*Primary Examiner* — Renee Chavez
(74) *Attorney, Agent, or Firm* — ALG Intellectual Property, LLC (57) ABSTRACT

A projector has plural liquid crystal light valves each of which modulates color light, a cross dichroic prism which combines the color lights modulated by the plural liquid crystal light valves, and a projection lens which projects the light combined by the cross dichroic prism. The projector includes: a holding unit which holds the liquid crystal light valve; and a supporting member having a body unit supported to the cross dichroic prism and first plate-like portions which protrude from the body unit and support the holding unit. The first plate-like portions are inclined from a vertical plane including an optical axis of the liquid crystal light valve.

5 Claims, 8 Drawing Sheets

PROJECTOR HAVING HOLDING UNIT FOR LIGHT MODULATING DEVICE AND SUPPORTING MEMBER FOR THE HOLDING UNIT

BACKGROUND

1. Technical Field

The present invention relates to a projector.

2. Related Art

According to a related art, a projector including plural light modulating devices each of which modulates color light, alight combining device which combines the color lights modulated by the light modulating devices and a projection lens which projects the light combined by the light combining device is known. Also, a structure for supporting the light modulating devices is proposed (see, for example, JP-A-2009-210779).

The projector disclosed in JP-A-2009-210779 has an optical device body. The optical device body has the light modulating devices, a light exiting-side polarizer, a plate-like member, a cross-dichroic prism (light combining device), a first supporting member, and a second supporting member or the like.

The first supporting member is a metallic member. The light modulating devices are fixed to the first supporting member with an adhesive, screws or the like. At the four corners of the first supporting member, a substantially rectangular insertion hole is formed. The second supporting member is made of a metallic member, and a pin inserted in the insertion hole of the first supporting member is provided protruding from a rectangular frame-like site.

The first supporting member is fixed to the second supporting member as an adhesive or the like is applied between the insertion hole and the pin. The second supporting member is fixed to the cross dichroic prism with an adhesive or the like via the plate-like member.

In this way, the light modulating devices fixed to the first supporting member are supported by the pin of the second supporting member.

Although JP-A-2009-210779 does not describe details of the pin of the second supporting member, the second supporting member is made of a plate member and the pin is in the shape of a plate protruding from the rectangular frame-like site, as can be seen in the drawings. Such plural pins are provided along vertical and horizontal directions.

However, it is conceivable that the pin of the second supporting member described in JP-A-2009-210779 may fall over or deform otherwise because of residual stress in working, temperature rise due to light irradiation, or the like. Also, when a falling or the like of the projector causes an impact on the optical device body, the pin may fall over. When the pin falls over, there is a risk that the amount of falling may directly represent the amount of shift of the light modulating device. As the position of the light modulating device shifts, there is a problem of deterioration in image quality of a projected image.

SUMMARY

An advantage of some aspects of the invention is to solve at least a part of the problems described above, and the invention can be realized in the following forms or application examples.

Application Example 1

This application example of the invention is directed to a projector having plural light modulating devices each of which modulates color light, a light combining device which combines the color lights modulated by the plural light modulating devices, and a projection lens which projects the light combined by the light combining device, includes: a holding unit which holds the light modulating devices; and a supporting member having a body unit supported to the light combining device and a first plate-like portion which protrudes from the body unit and supports the holding unit. The first plate-like portion is inclined from a vertical plane including an optical axis of the light modulating devices.

With this configuration, the supporting member, the body unit, and the first plate-like portion which protrudes from the body unit and is inclined from the vertical plane including the optical axis are provided. The holding unit holding the light modulating devices is supported by the first plate-like portion. Thus, even when the first plate-like portion falls over toward the body unit or deforms otherwise because of residual stress in working, temperature rise due to light irradiation, or the like, the amount of deformation of the first plate-like portion in a direction along the vertical plane and in a direction orthogonal to the vertical plane is made smaller than the amount of falling over of the first plate-like portion.

That is, compared with a configuration in which the holding unit is supported by a plate-like portion along the vertical plane or by a plate-like portion along the direction orthogonal to the vertical plane, positional shifts of the holding unit, that is, of the light modulating devices held by the holding unit, in the direction along the vertical plane and in the direction orthogonal to the vertical plane can be restrained. Therefore, since a shift of pixels provided in the light modulating devices is restrained, the color lights modulated by the plural light modulating devices are accurately combined by the light combining device and the projector can project a high-definition image.

Application Example 2

In the projector according to the above application example, it is preferable that the first plate-like portion is situated on both sides of the vertical plane.

With this configuration, since the first plate-like portion is situated on both sides of the vertical plane, the first plate-like portion can support the holding unit in a well-balanced way. Thus, a shift of pixels in the light modulating devices can be restrained further.

Application Example 3

In the projector according to the above application example, it is preferable that plural units of the first plate-like portion are arranged outside of the light modulating devices, as viewed from a direction along the optical axis, and are formed in such a way that directions along plate surfaces of the first plate-like portions next to each other intersect with each other.

With this configuration, since the plural first plate-like portions are provided outside the light modulating devices, the first plate-like portions can support the holding unit in a better-balanced way. Moreover, the first plate-like portions are formed in such a way that directions along plate surfaces of the first plate-like portions next to each other intersect with each other. Thus, even when a force in a direction in which one of the plural first plate-like portions may easily fall over is applied because of residual stress in working, temperature rise due to light irradiation, or application of an impact of falling or the like of the projector, the force is in the direction in which the other first plate-like portions do not easily fall over and therefore a positional shift of the holding unit is restrained. Thus, a projector in which a shift of pixels is restrained against residual stress in working, temperature rise due to light irradiation or application of an impact of falling and which can project a high-definition image can be provided.

Application Example 4

In the projector according to the above application example, it is preferable that the first plate-like portion is formed with 180-degree rotational symmetry about the optical axis.

With this configuration, since the first plate-like portion is formed with 180-degree rotational symmetry about the optical axis, the first plate-like portion can support the holding unit in two directions. Thus, the assembly work for supporting the holding unit by the supporting member can be facilitated.

Application Example 5

In the projector according to the above application example, it is preferable that the supporting member further includes a second plate-like portion which supports the holding unit, along at least one of a direction along the vertical plane and a direction orthogonal to the vertical plane.

With this configuration, the supporting member has the second plate-like portion formed along the direction along the vertical plane or the direction orthogonal to the vertical plane, in addition to the first plate-like portion inclined from the vertical plane. Thus, for example, when the supporting member is pressed out of a base member (a large-sized plate member or a rolled plate member), complex shaping is restrained and an efficient number of units taken from the base member is realized. Thus, the supporting member which stably supports the holding unit can be formed. Moreover, since the shape of the supporting member after the working can be measured more easily, complexity of component management can be relaxed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a projector according to a first embodiment will be described with reference to the drawings.

The projector of this embodiment modulates a luminous flux emitted from a light source according to image information and projects the luminous flux onto a screen or the like in an enlarged manner.

Figure 1:
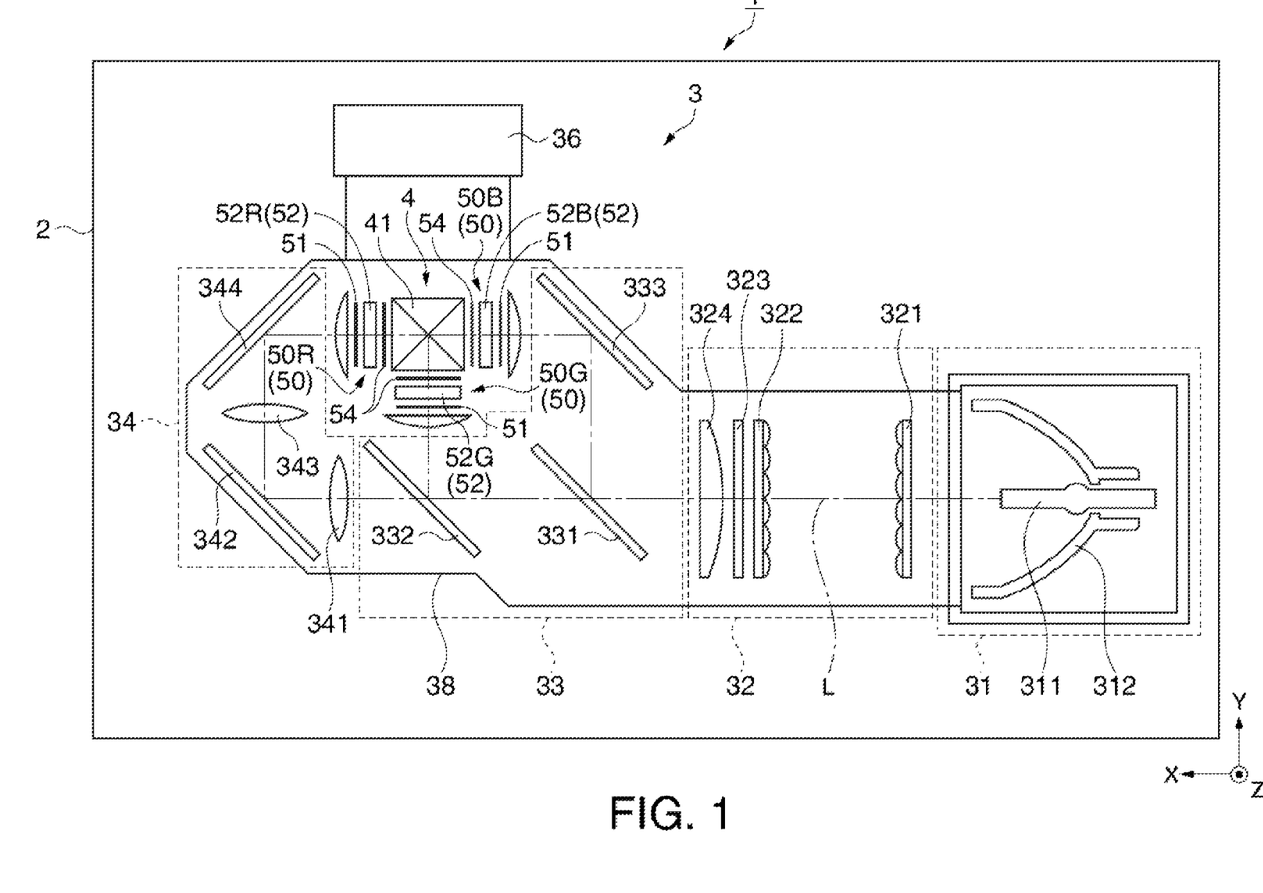
FIG. 1 is a schematic view showing a general configuration of a projector according to a first embodiment.

FIG. 1 is a schematic view showing a general configuration of a projector 1 according to this embodiment.

As shown in FIG. 1, the projector 1 has an exterior casing 2 forming an exterior, a control unit (not shown), and an optical unit 3 having a light source device 31. Although not shown, a power supply unit which supplies power to the light source device 31 and the control unit, a cooling device which cools the optical unit 3, and the like are arranged inside the exterior casing 2.

The exterior casing 2 has an upper case forming an upper part and a lower case forming a lower part, though not described in detail. The exterior casing 2 is provided with a suction portion for taking in the outside air and a discharge port for discharging heated air in the exterior casing 2 to the outside, or the like.

The control unit has a CPU (central processing unit), a ROM (read only memory), a RAM (random access memory) and the like and functions as a computer. The control unit performs control of operations of the projector 1, for example, control related to projection of an image.

Configuration of Optical Unit

The optical unit 3 optically processes and projects a luminous flux emitted from the light source device 31 under the control of the control unit.

The optical unit 3 has, in addition to the light source device 31, an illumination integration system 32, a color separation system 33, a relay system 34, an electro-optic device 4, a projection lens 36, a head body 37 (see FIG. 2), and an optical component casing 38 in which there members are arranged at predetermined positions on the optical path, as shown in FIG. 1.

The optical unit 3 is formed in a substantially L-shape as viewed in a plan view, as shown in FIG. 1. The light source device 31 is removably arranged at one end of the optical unit 3, and the projection lens 36 is arranged at the other end. Hereinafter, for convenience of explanation, a direction in which a luminous flux is emitted from the light source device 31 is referred to as +X direction (leftward direction). A direction in which a luminous flux is emitted from the projection lens 36 is referred to as +Y direction (forward direction). An upward direction in an installed state where the projector 1 is installed on a desk or the like is referred to as +Z direction (upward direction).

The light source device 31 has a discharge-type light source 311 made up of an ultrahigh pressure mercury lamp, metal halide lamp or the like, and a reflector 312 or the like. The light source device 31 aligns the direction of emission of the luminous flux emitted from the light source 311, by the reflector 312, and emits the luminous flux toward the illumination integration system 32.

The illumination integration system 32 has a first lens array 321, a second lens array 322, a polarization conversion array 323, and a superimposing lens 324.

The first lens array 321 is an optical element which divided the luminous flux emitted from the light source device 31 into plural partial luminous fluxes, and has plural small lenses arrayed in a matrix within a plane substantially orthogonal to an optical axis L of the luminous flux emitted from the light source device 31.

The second lens array 322 has substantially the same configuration as the first lens array 321, and together with the superimposing lens 324, superimposes the partial luminous fluxes emitted from the first lens array 321 onto a surface of a liquid crystal light valve 52, which will be described later.

The polarization conversion element 323 has a function of aligning randomly polarized light emitted from the second lens array 322 into substantially one type of polarized light that can be used on the light crystal light valve 52.

The color separation system 33 has two dichroic mirrors 331, 332 and a reflection mirror 333 and has a function of separating the luminous flex emitted from the illumination integration system 32 into color lights of three colors, that is, red light (hereinafter referred to as "R light"), green light (hereinafter referred to as "G light") and blue light "hereinafter referred to as "B light").

The relay system 34 has a light incident-side lens 341, a relay lens 343, and reflection mirrors 342, 344 and has a function of guiding the R light separated by the color separation system 33 to an R light liquid crystal light valve 52R. Here, the optical unit 3 is configured in such a way that the relay system 34 guides the R light. However, the optical unit 3 is not limited to this configuration and may be configured, for example, in such a way that the relay system 34 guides the B light.

The electro-optic device 4 has optical devices provided for each color light, and a cross dichroic prism 41 as a light combining device.

Figure 3:
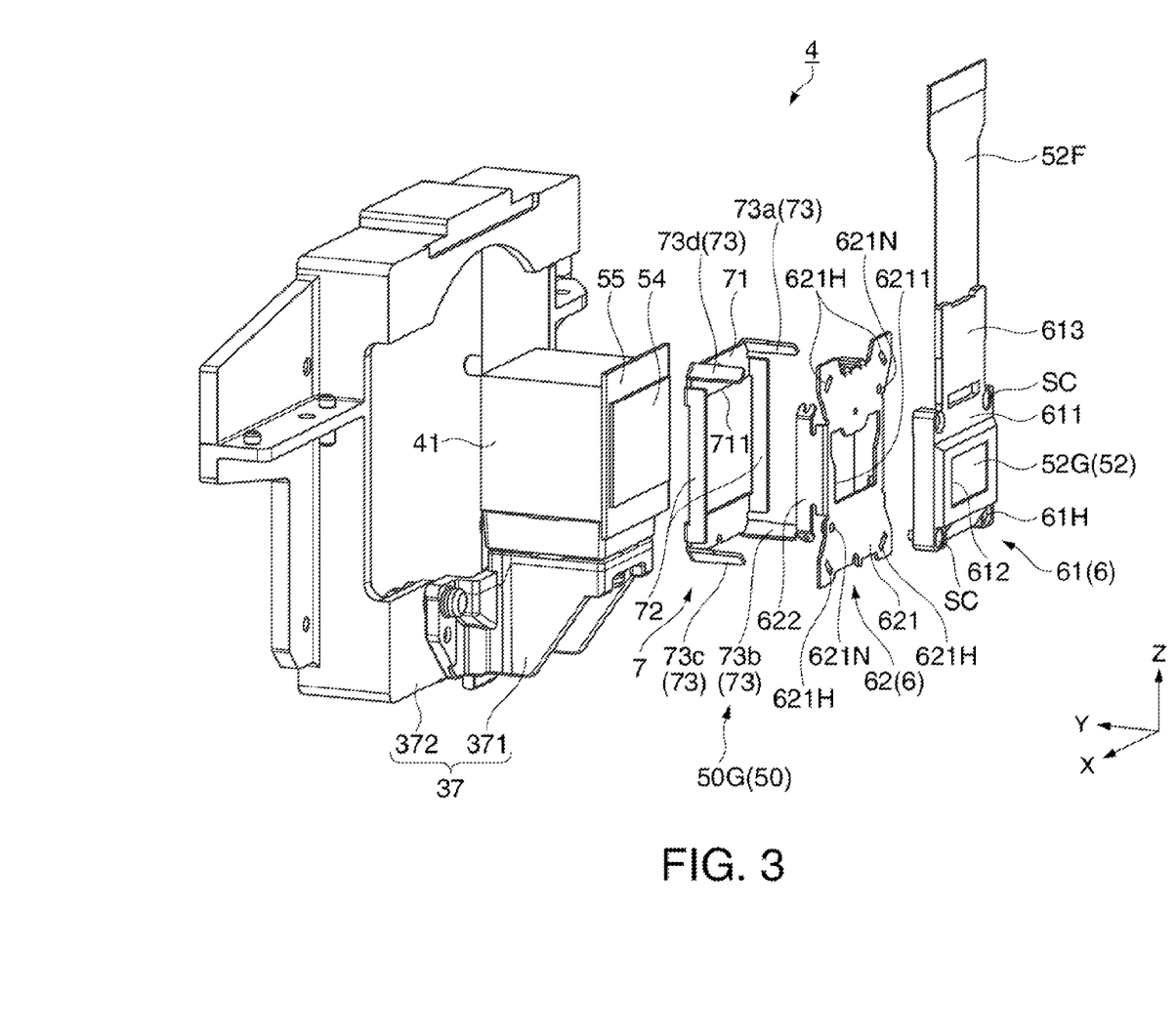
FIG. 3 is an exploded perspective view showing the optical device body and the cross dichroic prism according to the first embodiment.

Each optical device has a light incident-side polarizer 51, a liquid crystal light valve 52 as a light modulating device (the R light liquid crystal light valve is 52R, the G light liquid crystal light valve is 52G, and the B light liquid crystal light valve is 52B), an optical compensation element (not shown), a light exiting-side polarizer 54, and a light transmitting substrate 55 (see FIG. 3).

The light incident-side polarizer 51 transmits polarized light aligned by the polarization conversion element 323, of the color lights separated by the color separation system 33, then absorbs polarized light that is different from that polarized light, and emits the polarized light to the liquid crystal light valve 52.

The liquid crystal light valve 52 is configured with a liquid crystal as an electro-optic material tightly enclosed between a pair of transparent glass substrates, and a rectangular pixel area in which small pixels, not shown, are formed in a matrix is formed thereon. A flexible printed board 52F (see FIG. 3) is connected to an upper end of the liquid crystal light valve 52.

In the liquid crystal light valve 52, the state of orientation of the liquid crystal is controlled by a drive signal inputted from the control unit via the flexible printed board 52F, and a display image is formed in the pixel area. The liquid crystal light valve 52 then modulates the color light emitted from the light incident-side polarizer 51 according to image information.

The optical compensation element (not shown) and the light exiting-side polarizer 54 have substantially the same function as the light incident-side polarizer 51 and are sequentially arranged on a luminous flex exiting side of the liquid crystal light valve 52. The optical compensation element and the light exiting-side polarizer 54 then transmit polarized light of a predetermined direction, of the luminous flux emitted from the liquid crystal light valve 52, then absorb polarized light that is different from that polarized light and emits the polarized light to the cross dichroic prism 41. By thus arranging the optical compensation element and the light exiting-side polarizer 54, the contrast of a projected image is increased, and the absorbed luminous flux is proportionally divided to the optical compensation element and the light exiting-side polarizer 54, thus restraining overheat of these members.

The light transmitting substrate 55 is a highly thermally conductive plate member such as crystal and is configured to be attached to the cross dichroic prism 41 to contribute to the restraining of temperature rise in the light exiting-side polarizer 54.

Each optical device has the light incident-side polarizer 51 attached to a glass plate and is arranged in the optical component casing 38. The liquid crystal light valve 52, the optical compensation element (not shown) and the light exiting-side polarizer 54 form an optical device body 50, together with members which will be described later, and are attached to the cross dichroic prism 41 for each color light. The optical device body for R light is 50R. The optical device body for G light is 50G. The optical device body for B light is 50B. Specific configurations of these optical device bodies will be described in detail later.

The cross dichroic prism 41 is substantially square, as viewed in a plan view, having four right-angled prisms bonded to each other. The cross dichroic prism 41 has three light incident-side end surfaces which each optical device is arranged to face. In the cross dichroic prism 41, two dielectric multilayer films are formed on the boundaries between the right-angled prisms bonded to each other. Thus, the cross dichroic prism 41 combines each color light incident on each light incident-side end surface and emits the combined light. Specifically, in the cross dichroic prism 41, the dielectric multilayer films reflect the color lights modulated by the liquid crystal light valves 52R, 52B, transmit the color light modulated by the liquid crystal light valve 52G, and combines each color light.

The projection lens 36 is configured as a lens set including a combination of plural lenses and projects the light combined by the cross dichroic prism 41 onto a screen in an enlarged manner.

Figure 2:
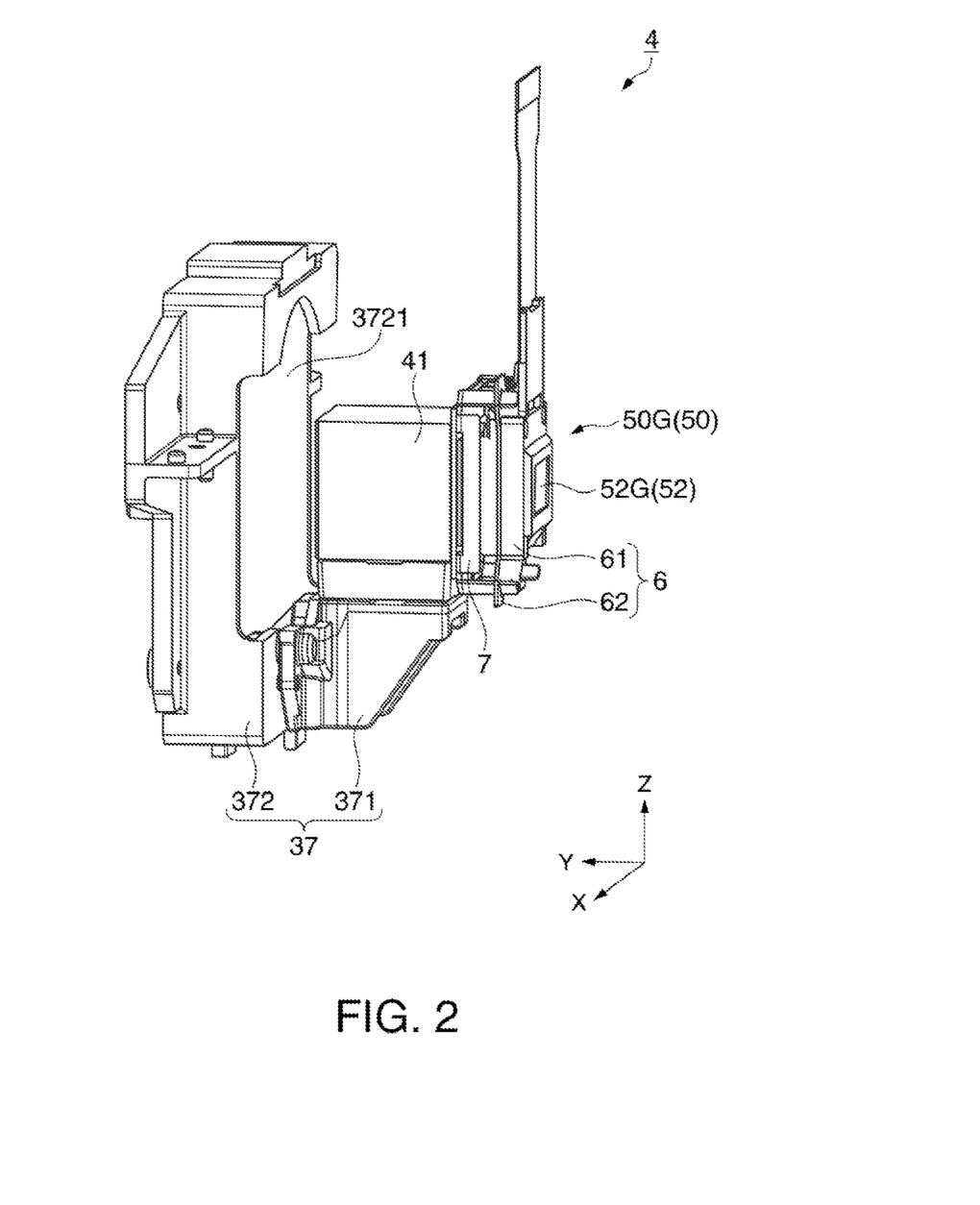
FIG. 2 is a perspective view showing an optical device body, a cross dichroic prism and a head body according to the first embodiment.

FIG. 2 is a perspective view of the optical device body 50G, the cross dichroic prism 41 and the head body 37.

The head body 37 supports the electro-optic device 4 and the projection lens 36. The head body 37 has a prism supporting portion 371 situated below the cross dichroic prism 41, and a lens supporting portion 372 situated to the front (+Y direction) of the cross dichroic prism 41, as shown in FIG. 2.

The prism supporting portion 371 supports the cross dichroic prism 41 and the optical device bodies 50R, 50G, 50B as a lower surface of the cross dichroic prism 41 is adhered and fixed to the prism supporting portion 371.

The lens supporting portion 372 supports the projection lens 36. The lens supporting portion 372 has an aperture 3721 through which the luminous flux emitted from the cross dichroic prism 41 is transmitted. Although not shown, the projection lens 36 is fixed to a forward side of the lens supporting portion 372. The prism supporting portion 371 is fixed to a rear side of the lens supporting portion 372, as shown in FIG. 2. The head body 37 is installed in the optical component casing 38.

Configuration of Optical Device Body

Now, a specific configuration of the optical device body 50 will be described, taking the optical device body 50G in particular.

Figure 4:
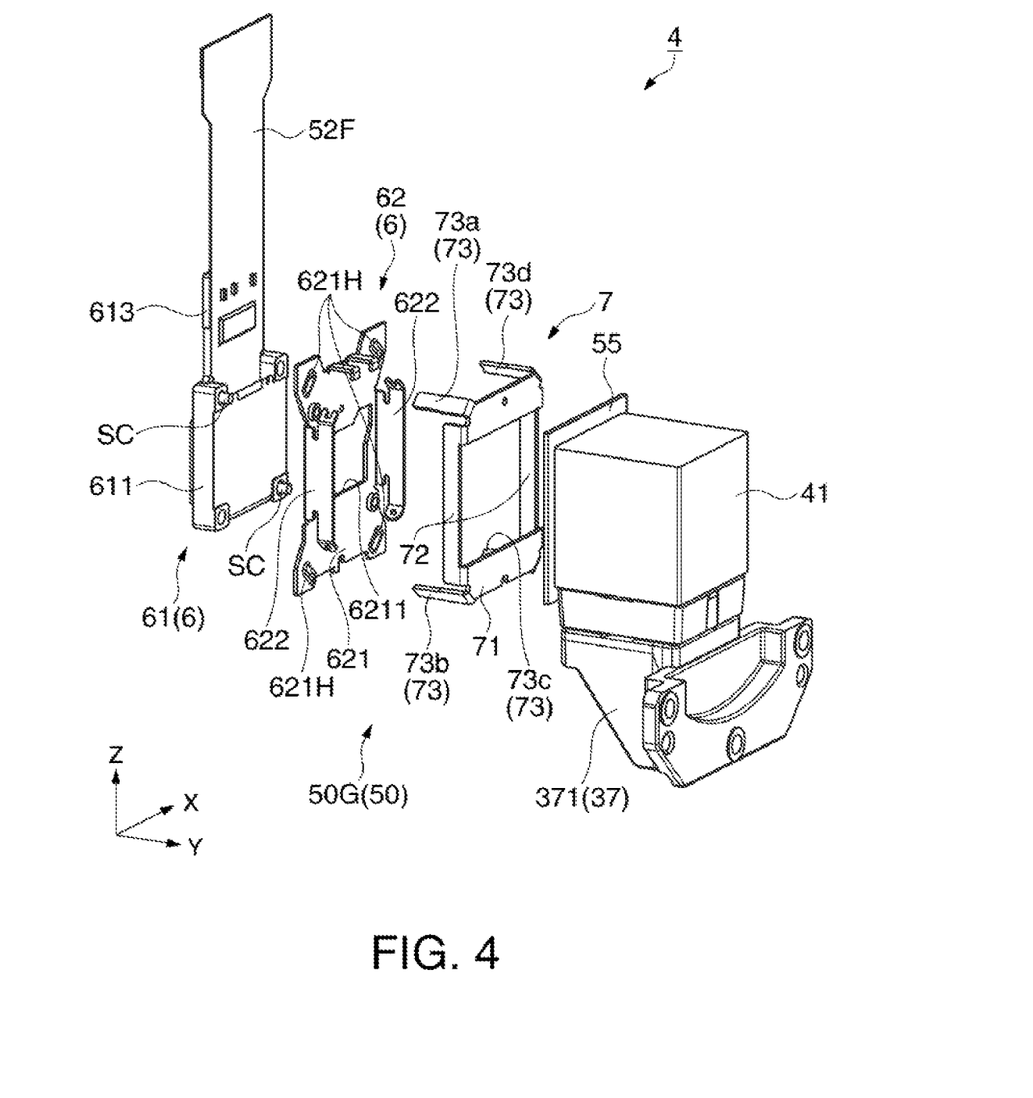
FIG. 4 is an exploded perspective view showing the optical device body and the cross dichroic prism according to the first embodiment.

FIGS. 3 and 4 are exploded perspective views of the optical device body 50G and the cross dichroic prism 41. FIG. 3 is a view from obliquely rear. FIG. 4 is a view from obliquely forward.

The optical device body 50G has a holding unit 6 and a supporting member 7, in addition to the liquid crystal light valve 52G, the optical compensation element (not shown), the light exiting-side polarizer 54 and the light transmitting substrate 55, as shown in FIGS. 3 and 4.

The light transmitting substrate 55 has a rectangular plate-like shape with a larger size than the light incident side end surface of the cross dichroic prism 41 and is attached to the light incident-side end surface of the cross dichroic prism 41, as shown in FIG. 3.

The light exiting-side polarizer 54 has a rectangular plate-like shape with a smaller size than the light transmitting substrate 55 and is attached to the light transmitting substrate 55.

The holding unit 6 is formed in such a way as to hold the liquid crystal light valve 52G and has a frame 61 and a fixture plate 62, as shown in FIGS. 3 and 4.

The frame 61 is metallic and has a frame portion 611 for housing the liquid crystal light valve 52G, and a heat radiating portion 613.

The frame portion 611 is formed in a rectangular shape as viewed in a plan view, as shown in FIG. 3, and an aperture 612 through which the G light separated by the color separation system 33 becomes incident is formed at a central part. At the four corners, a through-hole 61H penetrating the frame portion 611 in Y directions is provided.

The heat radiating portion 613 protrudes from an upper end of the frame portion 611 and is formed in a rectangular shape as viewed in a plan view. The heat radiating portion 613 is formed to the −Y side of the flexible printed board 52F.

The fixture plate 62 is arranged to the forward side of the frame 61 (to the side of the cross dichroic prism 41) and the frame 61 is fixed thereto. The fixture plate 62 also supports the optical compensation element held by a member, not shown. The fixture plate 62 is worked out of a metallic plate member and has a base portion 621 that is rectangular as viewed in a plan view, and a pair of standing portions 622.

At a central part of the base portion 621, an aperture 6211 through which the luminous flux emitted from the liquid crystal light valve 52 passes is formed. Two screw holes 621N are formed near the aperture 6211, as shown in FIG. 3. The two screw holes 621N are formed corresponding to two through-holes 61H at diagonal positions, of the four through-holes 61H provided in the frame 61.

The frame 61 in which the liquid crystal light valve 52 is housed is fixed to the −Y side of the fixture plate 62 as screws SC inserted in the through-holes 61H are tightened into the screw holes 621N.

At the four corners of the base portion 621, an insertion hole 621H which is rectangular as viewed in a plan view for inserting a first plate-like portion 73, described later, of the supporting member 7, is formed.

The standing portions 622 are formed protruding from left and right lateral edge parts of the base portion 621 toward the cross dichroic prism 41. The optical compensation element held by a member, not shown, is installed between this pair of standing portions 622.

The supporting member 7 is arranged to the forward side of the fixture plate 62 (to the side of the cross dichroic prism 41) and supports the holding unit 6.

Figure 5A:
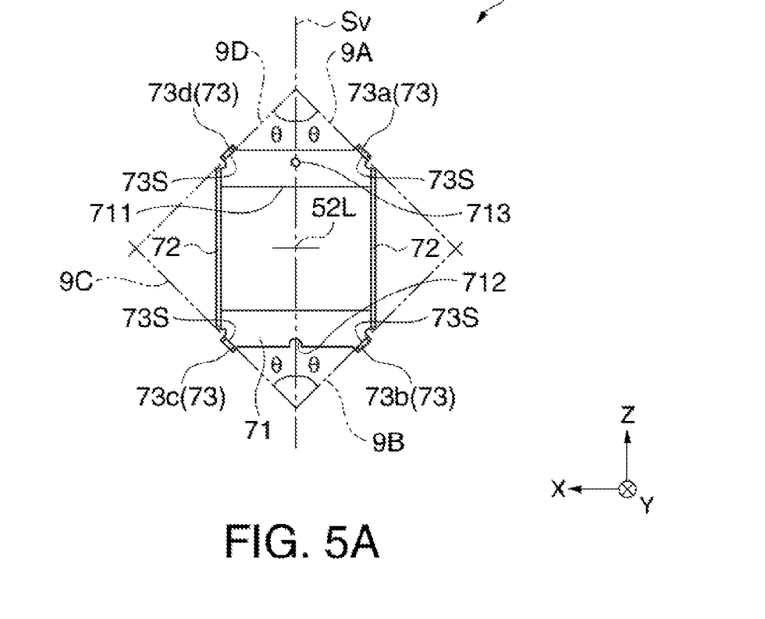
FIG. 5A is a plan view of a supporting member according to the first embodiment.
Figure 5B:
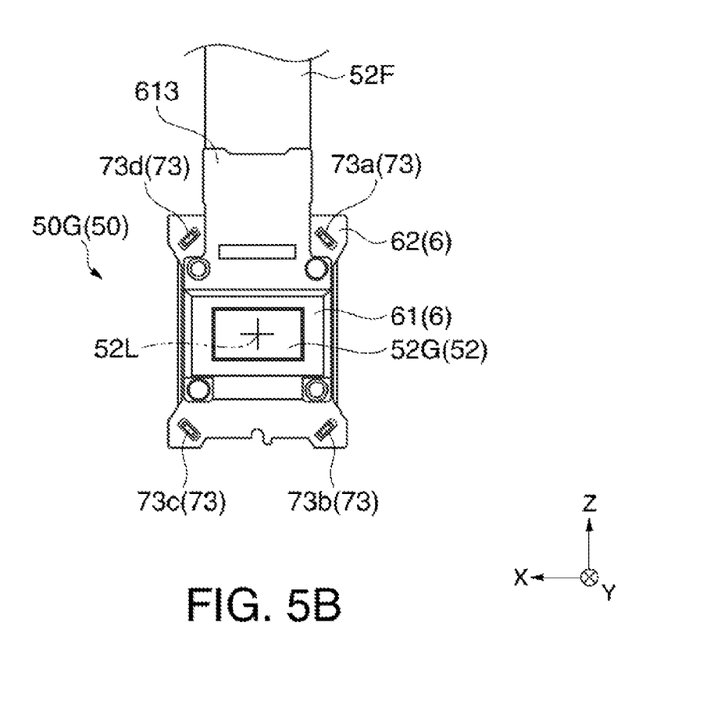
FIG. 5B is a front view of the optical device body according to the first embodiment.

FIG. 5A is a plan view of the supporting member 7. FIG. 5B is a front view of the optical device body 50G.

The supporting member 7 is worked out of a metallic plate member and has a body portion 71, a standing portion 72 and a first plate-like portion 73, as shown in FIGS. 3 to 5B.

The body portion 71 is a site supported to the cross dichroic prism 41 via the light transmitting substrate 55 and is formed in a rectangular shape as viewed in a plan view, with substantially the same size as the light transmitting substrate 55. At a central part of the body portion 71, a larger aperture 711 than the outer shape of the light exiting-side polarizer 54 is formed.

Also, a circular hole 713 above the aperture 711 and a semicircular cut-out 712 at a lower end part are formed in the body portion 71, as shown in FIG. 5A. The circular hole 713 and the cut-out 712 are used as references when the shape of the supporting member 7 is measured.

The standing portion 72 is formed by protruding substantially at 90 degrees from left and right lateral edge parts of the body portion 71 toward the fixture plate 62.

As shown in FIGS. 3 to 5B, the first plate-like portion 73 is formed by protruding substantially at 90 degrees from the four corners of the body portion 71 toward the fixture plate 62 and having a plate surface 73S which is rectangular as viewed in a plan view (see FIG. 5A). The first plate-like portion 73 has a first plate-like portion 73a situated at the top right corner of the body portion 71 and first plate-like portions 73b, 73c, 73d formed in a clockwise order from the first plate-like portion 73a, as shown in FIG. 5A.

The first plate-like portions 73a, 73b are situated to the right (to the −X side) of the optical axis 52L of the liquid crystal light valve 52G. The first plate-like portions 73c, 73d are situated to the left (to the +X side) of the optical axis 52L. The first plate-like portions 73a, 73d are situated on both sides of the flexible printed board 52F, as shown in FIG. 5B. The first plate-like portions 73a, 73b, 73c, 73d are arranged, forming an annular shape on the outside of the liquid crystal light valve 52G, as viewed from a direction along the optical axis 52L.

The first plate-like portions 73a, 73b, 73c, 73d are inserted in the insertion holes 621H of the base portion 621 and support the holding unit 6. The insertion holes 621H are set in such a way that the first plate-like portions 73a, 73b, 73c, 73d can be inserted therein in a loosely fitting state.

The first plate-like portions 73a, 73b, 73c, 73d are formed, inclined from a vertical plane Sv including the optical axis 52L of the liquid crystal light valve 52.

Specifically, the first plate-like portions 73a, 73b, 73c, 73d are formed, protruding from the body portion 71 in such a way that the plate surface 73S on the inside faces the side of the optical axis 52L, and in such a way that the diagonally situated first plate-like portion 73a and first plate-like portion 73c face each other while the diagonally situated first plate-like portion 73b and first plate-like portion 73d face each other, as shown in FIG. 5A.

Also, the first plate-like portions 73a, 73b, 73c, 73d are formed in such a way that the directions along the plate surfaces 73S (extending directions) of the first plate-like portions 73 next to each other intersect with each other. For example, if the extending directions of the first plate-like portions 73a, 73b, 73c, 73d are referred to as extending directions 9A, 9B, 9C, 9D, respectively, the first plate-like portion 73a is formed in such a way that the extending direction 9A intersects with the extending directions 9B, 9D of the first plate-like portions 73b, 73d which are next to the first plate-like portion 73a. Similarly to the first plate-like portion 73a, the first plate-like portions 73b, 73c, 73d are formed in such a way that the extending directions of the first plate-like portions 73 next to each other intersect with each other.

The first plate-like portions 73a, 73b, 73c, 73d are formed in such a way that an angle (inclination angle $\theta$) formed by the plate surface 73S and the vertical plane Sv is an acute angle, as shown in FIG. 5A. The first plate-like portions 73a, 73b, 73c, 73d of this embodiment are formed in such a way that the inclination angle $\theta$ is substantially 45 degrees.

The first plate-like portions 73a, 73b, 73c, 73d are formed with 180-degree rotational symmetry about the optical axis 52L of the liquid crystal light valve 52.

However, the inclination angle $\theta$ of the first plate-like portions 73a, 73b, 73c, 73d is not limited to 45 degrees and may be within a range of 20 to 70 degrees. Also, the first plate-like portions 73a, 73b, 73c, 73d may be formed asymmetrically about the optical axis 52L or the vertical plane Sv. The first plate-like portions do not need to have the same inclination angle $\theta$ and may be formed with different inclination angles $\theta$ from each other.

The holding unit 6 is adjusted in position (adjusted in focusing and alignment) while being supported by the supporting member 7, and is then fixed to the supporting member 7 via a UV adhesive or the like applied to the first plate-like portions 73 and the insertion holes 621H. The supporting member 7, on which the holding unit 6 is supported, is adjusted in position (adjusted in alignment) and is then fixed to the light transmitting substrate 55 with an UV adhesive applied between the body portion 71 and the light transmitting substrate 55.

Although not described in detail, optical device bodies 50R, 50B have a similar configuration to the optical device body 51G and are adjusted similarly to the optical device body 50G so as to be fixed respectively to each light incident-side end surface of the cross dichroic prism 41.

As described above the projector 1 of this embodiment can achieve the following effects.

(1) Even when the first plate-like portions 73 fall over or deform otherwise in relation to the body portion 71 because of residual stress in working and temperature rise due to light irradiation or the like, the amount of deformation of the first plate-like portions 73 in a direction along the vertical plane Sv and in a direction orthogonal to the vertical plane Sv is smaller than the amount of falling over of the first plate-like portions 73.

That is, compared with a configuration in which the holding unit 6 is supported by plate-like portions along the vertical plane Sv or plate-like portions along a direction orthogonal to the vertical plane Sv, a positional shift of the liquid crystal light valve 52 held on the holding unit 6 in the direction along the vertical plane Sv and in the direction orthogonal to the vertical plane Sv can be restrained. Therefore, since a pixel shift in the liquid crystal light valve 52 is restrained, color lights modulated by the liquid crystal light valves 52R, 52G, 52B are accurately combined by the cross dichroic prism 41. The projector 1 can project a high-definition image.

(2) The first plate-like portions 73a, 73b, 73c, 73d are provided on both sides of the vertical plane Sv and therefore can support the holding unit 6 in a well-balanced way. Thus, a pixel shift in the liquid crystal light valve 52 can be restrained further.

(3) The first plate-like portions 73a, 73b, 73c, 73d are provided forming an annular shape outside the liquid crystal light valve 52 and therefore can support the holding unit 6 in a better-balanced way. Moreover, the first plate-like portions 73a, 73b, 73c, 73d are formed in such a way that directions along the plate surfaces 73S of the first plate-like portions 73 next to each other intersect with each other. Thus, even when a force in a direction in which one of the first plate-like portions 73a, 73b, 73c, 73d can easily fall over is applied because of residual stress in working, temperature rise due to light irradiation, or application of an impact of falling or the like of the projector 1, that force is in the direction in which the other first plate-like portions 73 do not fall over easily and therefore a positional shift of the holding unit 6 is restrained. Thus, the projector 1 which can restrain a pixel shift against residual stress in working, temperature rise due to light irradiation or an impact of falling or the like and can project a high-definition image can be provided.

(4) The first plate-like portions 73a, 73b, 73c, 73d are formed with 180-degree rotational symmetry about the optical axis 52L and therefore can support the holding unit 6 in two directions. Thus, the assembly work for supporting the holding unit 6 by the supporting member 7 can be facilitated.

Second Embodiment

Next, a projector 1 according to a second embodiment will be described with reference to the drawings. Hereinafter, similar structures and similar members to the projector 1 of the first embodiment are denoted by the same reference numerals and detailed descriptions thereof are omitted or simplified.

The projector 1 of this embodiment has a supporting member 27 of a different shape from the supporting member 7 of the first embodiment.

Figure 6:
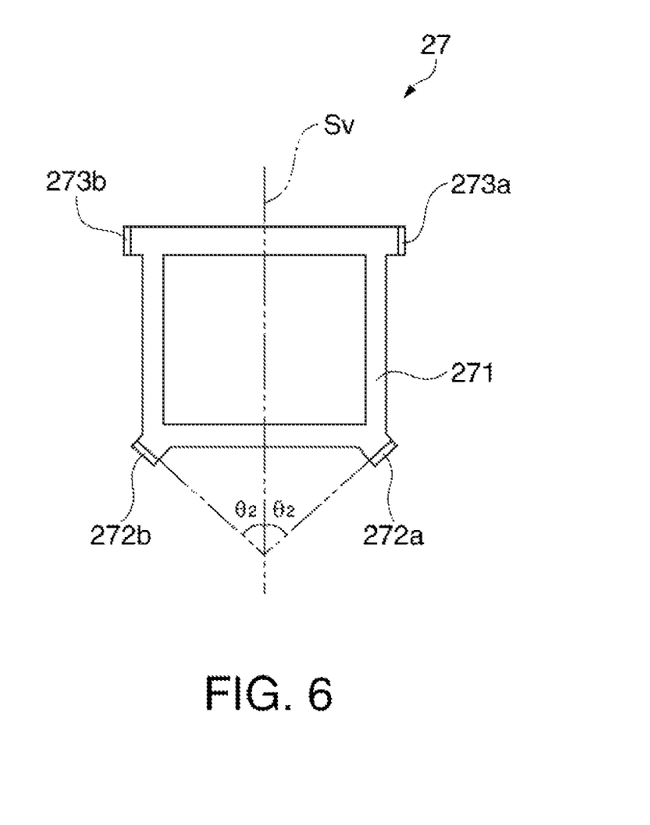
FIG. 6 is a plan view schematically showing a supporting member according to a second embodiment.

FIG. 6 is a plan view schematically showing the supporting member 27 of this embodiment.

The supporting member 27 is worked out of a metallic plate member and has a body portion 271, and first plate-like portions 272a, 272b and second plate-like portions 273a, 273b which are protruding from the four corners of the body portion 271, as shown in FIG. 6.

The first plate-like portions 272a, 272b are formed protruding from the bottom left and right corners of the body portion 271, as viewed in FIG. 6, and each having an inclination angle $\theta_2$ from the vertical plane Sv.

The second plate-like portions 273a, 273b are formed protruding from the top left and right corners of the body portion 271, as viewed in FIG. 6, and along the vertical plane Sv.

Although not shown, insertion holes in which the first plate-like portions 272a, 272b and the second plate-like portions 273a, 273b are inserted are formed in the holding unit 6. The holding unit 6 is thus supported by the supporting member 27 as in the first embodiment.

The first plate-like portions 272a, 272b may have the inclination angle $\theta_2$ within a range of 20 to 70 degrees. The first plate-like portions 272a, 272b and the second plate-like portions 273a, 273b may be formed symmetrically about the vertical plane Sv or may be formed asymmetrically. Also, the first plate-like portions 272a, 272b and the second plate-like portions 273a, 273b may be arranged on both sides of the vertical plane Sv. The second plate-like portions 273a, 273b may be formed along a direction orthogonal to the vertical plane Sv.

As described above, the projector 1 of this embodiment can achieve the following effects in addition to the effect of the first embodiment.

The supporting member 27 has the second plate-like portions 273a, 273b formed along the vertical plane Sv, in addition to the first plate-like portions 272a, 272b inclined from the vertical plane Sv. Thus, when the supporting member 27 is pressed out of a base member (a large-sized plate member or a rolled plate member), complex shaping is restrained and an efficient number of units taken from the base member is realized. Thus, the supporting member 27 which stably supports the holding unit 6 can be formed. Moreover, since the shape of the supporting member 27 after the working can be measured more easily, complexity of component management can be relaxed.

The foregoing embodiment can be altered as follows.

Modification 1

The first plate-like portions 73a, 73b, 73c, 73d of the first embodiment are protruding and inclined from the vertical plane Sv in such a way that the plate surfaces 73S face the optical axis 52L. However, the first plate-like portions may be inclined from the vertical plane Sv by protruding in other directions.

Figure 7:
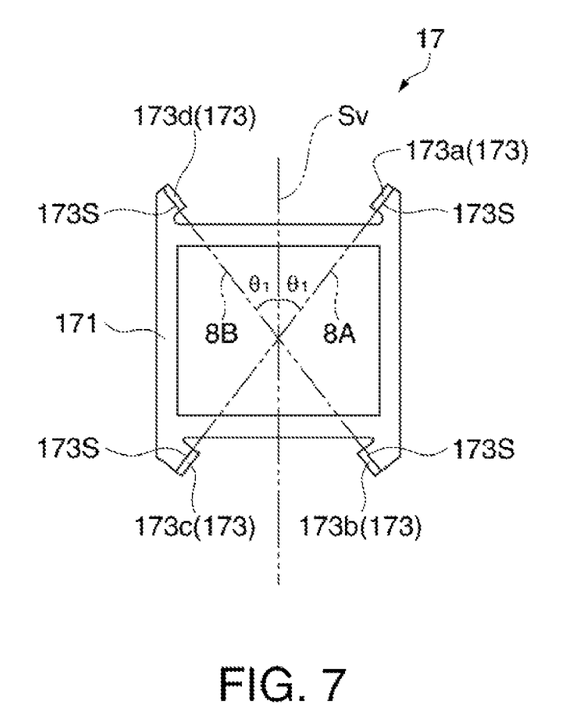
FIG. 7 is a plan view schematically showing a supporting member according to Modification 1.

FIG. 7 is a plan view schematically showing a supporting member 17 according to Modification 1.

The supporting member 17 has first plate-like portions 173a, 173b, 173c, 173d protruding from the four corners of a body portion 171. The first plate-like portions 173a, 173b, 173c, 173d are formed protruding in such away that plate surfaces 173S face out-of-plane directions of the body portion 171, and having an inclination angle $\theta_1$ from the vertical plane Sv.

The first plate-like portions 173a, 173b, 173c, 173d are formed in such a way that the first plate-like portions 173a, 173c situated on one diagonal line are along a first direction 8A while the first plate-like portions 173b, 173d situated on the other diagonal line are along a second direction 8B intersecting with the first direction 8A, as shown in FIG. 7. That is, the first plate-like portions 173a, 173b, 173c, 173d are formed in such a way that directions along the plate surfaces 173S of the first plate-like portions 173 next to each other intersect with each other, similarly to the first plate-like portions 73 of the first embodiment.

As long as the inclination angle $\theta_1$ is within a range of 20 to 70 degrees, the first plate-like portions 173a, 173b, 173c, 173d may be formed symmetrically or asymmetrically about the optical axis 52L or the vertical plane Sv.

Modification 2

In the above embodiments, the four plate-like portions support the holding unit 6. However, the holding unit 6 may be supported by a different number from four, for example, three plate-like portions.

Figure 8:
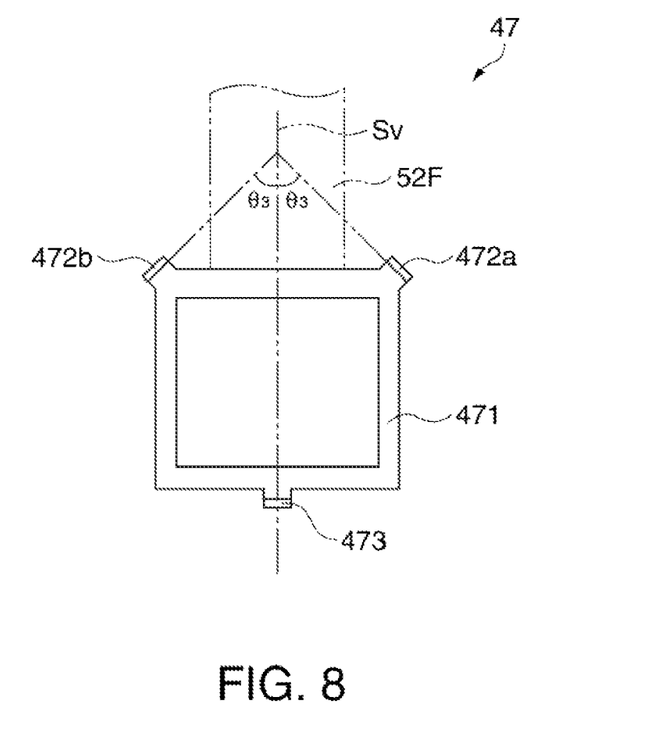
FIG. 8 is a plan view schematically showing a supporting member according to Modification 2.

FIG. 8 is a plan view schematically showing a supporting member 47 according to Modification 2.

The supporting member 47 is configured to support the holding unit 6 with two first plate-like portions 472a, 472b and one second plate-like portion 473, as shown in FIG. 8.

The first plate-like portions 472a, 472b protrude respectively from the top left and right ends of a body portion 471. The first plate-like portions 472a, 472b are formed having an inclination angle $\theta_3$ from the vertical plane Sv and situated outside of the flexible printed board 52F.

The second plate-like portion 473 is formed protruding from the center on a lower end part of the body portion 471 and along a direction orthogonal to the vertical plane Sv.

In the configuration for supporting the holding unit 6 with three plate-like portions in this manner, by arranging two plate-like portions on the side where the flexible printed board 52F protrudes, the shape of the flexible printed board 52F can be simplified and the holding unit 6 can be supported in a well-balanced way.

Modification 3

The optical device according to the embodiments has the optical compensation element, but may be configured without having the optical compensation element. Also, the optical device may be configured with another optical element such as a retardation film, instead of the optical compensation element.

The optical device of the embodiments has the light transmitting substrate 55, but may be configured without having the light transmitting substrate 55.

The supporting members, 7, 17, 27, 47 of the embodiments are made of a metallic plate member, but may be formed by molding a molten metal.

Modification 4

The projector 1 of the embodiment uses the transmitting-type liquid crystal light valve 52 as a light modulating device. However, the projector may use a reflection-type liquid crystal light valve.

Modification 5

The light source 311 is not limited to a discharge lamp and may be configured by other types of lamps or solid-state light sources such as light emitting diode.

The entire disclosure of Japanese Patent Application No. 2011-145376, filed Jun. 30, 2011 is expressly incorporated by reference herein.

What is claimed is:

1. A projector having plural light modulating devices each of which modulates color light, a light combining device which combines the color lights modulated by the plural light modulating devices, and a projection lens which projects the light combined by the light combining device, the projector comprising:
   a holding unit having
      a frame which holds the light modulating devices, and
      a fixture plate; and
   a supporting member having a body unit supported to the light combining device and a first plate-like portion which protrudes from the body unit and supports the holding unit;
   wherein
      the fixture plate holds the frame,
      the first plate-like portion is inclined from a vertical plane including an optical axis of the light modulating devices,
      the fixture plate has an insertion hole having a rectangular shape, as viewed in plan view, for insertion of the first plate-like portion,
      the rectangular insertion hole is inclined from the vertical plane, and the first plate-like portion is formed with 180-degree rotational symmetry about the optical axis.

2. The projector according to claim 1, wherein the first plate-like portion is situated on both sides of the vertical plane.

3. The projector according to claim 1, wherein plural units of the first plate-like portion are arranged outside of the light modulating devices, as viewed from a direction along the optical axis, and are formed in such a way that directions along plate surfaces of the first plate-like portions next to each other intersect with each other.

4. The projector according to claim 1, wherein the supporting member further includes
a second plate-like portion which supports the holding unit, along at least one of a direction along the vertical plane and a direction orthogonal to the vertical plane.

5. A projector having plural light modulating devices each of which modulates color light, a light combining device which combines the color lights modulated by the plural light modulating devices, and a projection lens which projects the light combined by the light combining device, the projector comprising:
a holding unit having
a frame which holds the light modulating devices, and
a fixture plate; and
a supporting member having
a body unit supported to the light combining device and having an aperture at a central part of the body unit, and
a first plate-like portion which protrudes from the body unit and supports the holding unit,
wherein
the fixture plate holds the frame,
the first plate-like portion is inclined from a vertical plane including an optical axis of the light modulating devices such that extending directions of plate surfaces of the first plate-like portion intersect in the aperture, when viewed in plan view,
the fixture plate has an insertion hole having a rectangular shape, as viewed in plan view, for insertion of the first plate-like portion,
the rectangular insertion hole is inclined from the vertical plane, and
the first plate-like portion is formed with 180-degree rotational symmetry about the optical axis.

* * * * *